United States Patent [19]
Shimamura

[11] Patent Number: 5,682,530
[45] Date of Patent: Oct. 28, 1997

[54] HIERARCHICAL RESOURCE MANAGEMENT METHOD

[75] Inventor: Nobuaki Shimamura, Tokyo, Japan

[73] Assignee: NEC Corporation, Tokyo, Japan

[21] Appl. No.: 450,783

[22] Filed: May 25, 1995

[30] Foreign Application Priority Data

May 27, 1994 [JP] Japan ................................. 6-138330

[51] Int. Cl.$^6$ .............................. G06F 9/46; G06F 12/02
[52] U.S. Cl. ................. 395/674; 395/676; 395/497.02; 395/497.03; 395/651; 395/492
[58] Field of Search ...................... 395/600, 674, 395/651, 497.02, 497.03, 676, 492; 364/200; 370/58.2

[56] References Cited

U.S. PATENT DOCUMENTS

| | | |
|---|---|---|
| 4,993,017 | 2/1991 | Bachinger ........................ 370/58.2 |
| 5,003,464 | 3/1991 | Ely .................................... 364/200 |
| 5,261,088 | 11/1993 | Baird ................................ 395/600 |

Primary Examiner—Lucien U. Toplu
Attorney, Agent, or Firm—Foley & Lardner

[57] ABSTRACT

With a time-sharing-oriented operating system, resource management groups are hierarchically formed including a plurality of processes. Each resource management group includes a resource management process for managing resources allocated to its group, at least one process which is a descendant of the resource management process and not included in other resource management groups, and a resource management block for storing information on the resources managed by its own group. Resource management processes are linked to each other in accordance with parent-child relationships between the respective resource management groups to form a resource management tree. At the generation of a new resource management group, resources necessary for the newly generated resource management group are distributed from resources owned by a parent resource management group of the newly generated resource management group in accordance with the resource management tree.

18 Claims, 8 Drawing Sheets

FIG.8

HIERARCHICAL RESOURCE MANAGEMENT METHOD

BACKGROUND OF THE INVENTION

1. Field of the Invention

The present invention relates to resource management methods for managing resources of the whole computer system by an operating system. More particularly, the invention relates to hierarchical resource management methods for hierarchically managing resources by a time-sharing-oriented operating system which conducts control such as generation and disappearance of processes in accordance with parent-child relationships of a tree structure, as well as dynamically managing resources on a process basis.

2. Description of the Related Art

Time-sharing-oriented operating systems such as UNIX use tree-structured data, in which process generation, disappearance and the like are controlled through control of a child process executed by a parent process.

Conventionally, such time-sharing-oriented operating systems dynamically conduct acquisition and release of resources (physical memory etc.), on a process basis, necessary for executing jobs. In a conventional resource management method by such a time-sharing-oriented operating system, the whole system shares resources. The conventional resource management method is therefore largely dependent for acquisition of resources by a predetermined process on operation of other processes. More specifically, at a time when the need of resources arises in a predetermined process, the necessary resources might not be available because they are in use for the operation of other process.

In a conventional resource management method by a time-sharing-oriented operating system, failure of resource acquisition through a predetermined process simply causes an error. In other words, the method inherently lacks such a function of securing resources to be used prior to execution of a job to ensure a job execution environment such as mainframe type operating systems have. This will cause delay of job execution by the process or abort of the execution at the worst.

SUMMARY OF THE INVENTION

An object of the present invention, intended for eliminating the foregoing drawbacks of a conventional resource management method, is to provide a hierarchical resource management method, for use in a time-sharing-oriented operating system, for hierarchically managing resources of the whole system to secure resources to be used on a job basis in advance.

Another object of the present invention is to provide a hierarchical resource management method which ensures execution of each job without being dependent on a process operating in an other resource management group and affecting such a process.

According to one aspect of the invention, there is provided a hierarchical resource management method by a time-sharing-oriented operating system for controlling process generation in accordance with parent-child relationships of a tree structure and dynamically managing resources on a process basis. The method comprises the steps of hierarchically forming resource management groups including a plurality of processes. There is a highest-order resource management group including a resource management route process for managing resources of the whole system, at least one process which is a descendant of the resource management route process and not included in other resource management groups, and a resource management block for storing information on resources managed by the resource management group.

Each of the resource management groups other than the highest-order resource management group includes a resource management process for managing resources allocated to its own group, at least one process which is a descendant of the resource management process and not included in other resource management groups, and a resource management block for storing information on resources managed by its own group.

A forming resource management tree is formed by linking the resource management route process and the resource management processes in accordance with parent-child relationships between the respective resource management groups.

At the generation of a new resource management group other than the highest-order resource management group, a necessary amount of resources is distributed for the newly generated resource management group from those owned by a parent resource management group of the newly generated resource management group in accordance with the resource management tree.

In the preferred construction, the hierarchical resource management method further comprises the steps of, at the generation of a resource management group, when a necessary amount of resources for the newly generated resource management group is covered by unused resources owned by an immediate parent resource management group of the newly generated resource management group, distributing the resources to the newly generated resource management group.

When the unused resources owned by the immediate parent resource management group of the newly generated resource management group are insufficient to satisfy the amount of resources necessary for the newly generated resource management group, resources equivalent to the shortage are distributed from a further preceding parent resource management group to descending resource management groups to secure the necessary amount and then the resources are allocated to the newly generated resource management group.

When the resource shortage can not be covered even by tracing back to the highest-order resource management group, if queuing for release of resources is impossible because of designation made at the generation of the new resource management group, as much resources as are securable in the resource management route process and the respective resource management processes are distributed to child resource management groups to allocate the resources to the newly generated resource management group.

When queuing for release of resources is possible, the resource management route process queues for release of resources from child resource management groups and sequentially distributes resources to child resource management groups upon acquisition of resources filling the shortage to allocate the resources to the newly generated resource management group.

In the preferred construction, the hierarchical resource management method further comprises the step of, when a resource management group disappears, releasing resources secured by the resource management group to disappear and combining the resources with unused resources owned by an immediate parent resource management group of the resource management group to disappear.

Also, distribution of resources to an individual process in the resource management group is made within a total amount of resources allocated to the resource management group.

In the preferred construction, the hierarchical resource management method further comprises the step of, when a resource management group disappears, releasing resources secured by the resource management group to disappear and combining the resources with unused resources owned by an immediate parent resource management group of the resource management group to disappear. Distribution of resources to an individual process in the resource management group is made within a total amount of resources allocated to the resource management group.

According to another aspect of the invention, a hierarchical resource management method by a time-sharing-oriented operating system for conducting control such as generation and disappearance of processes in accordance with parent-child relationships of a tree structure and dynamically managing resources on a process basis, comprising the steps of hierarchically forming resource management groups including a plurality of processes.

A highest-order resource management group includes a resource management route process for managing resources of the whole system, at least one process which is a descendant of the resource management route process and not included in other resource management groups, and a resource management block for storing information on resources managed by the resource management group.

Each of the resource management groups other than said highest-order resource management group includes a resource management process for managing resources allocated to its own group, at least one process which is a descendant of the resource management process and not included in other resource management groups, and a resource management block for storing information on resources managed by its own group.

At the generation of a new resource management group, when a necessary amount of resources for the newly generated resource management group is covered by unused resources owned by an immediate parent resource management group of the newly generated resource management group, the resources are distributed to the newly generated resource management group.

When the unused resources owned by the immediate parent resource management group of the newly generated resource management group are insufficient to satisfy the amount of resources necessary for the newly generated resource management group, resources equivalent to the shortage are distributed from a further preceding parent resource management group to descending resource management groups to secure the necessary amount and then the resources are allocated to the newly generated resource management group.

When the resource shortage can not be covered even by tracing back to the highest-order resource management group, if queuing for release of resources is impossible because of designation made at the generation of said new resource management group, as much resources as are securable in the resource management route process and the respective resource management processes are distributed to child resource management groups to allocate the resources to the newly generated resource management group.

When queuing for release of resources is possible, the resource management route process queues for release of resources from child resource management groups and sequentially distributes resources to child resource management groups upon acquisition of resources filling the shortage allocates the resources to the newly generated resource management group.

In the preferred construction, the hierarchical resource management method further comprises the step of, when a resource management group disappears, releasing resources secured by the resource management group to disappear and combining the resources with unused resources owned by an immediate parent resource management group of the resource management group to disappear.

In the preferred construction, distribution of resources to an individual process in a resource management group is made within a total amount of resources allocated to the resource management group.

Also, the hierarchical resource management method further comprises the step of, when a resource management group disappears, releasing resources secured by the resource management group to disappear and combining the resources with unused resources owned by an immediate parent resource management group of the resource management group to disappear. Distribution of resource to an individual process in a resource management group is made within a total amount of resources allocated to the resource management group.

According to a further aspect of the invention, a hierarchical resource management method by a time-sharing-oriented operating system for conducting control such as generation and disappearance of processes in accordance with parent-child relationships of a tree structure and dynamically managing resources on a process basis, comprising the steps of hierarchically forming resource management groups including a plurality of process management units for managing the processes.

A highest-order resource management group includes a process management unit for managing a resource management route process which manages resources of the whole system, at least one process management unit for managing a process which is a descendant of the resource management route process and not included in other resource management groups, and a resource management block for storing information on resources managed by the resource management group. Each process management unit links to the resource management block and said resource management block links to the process management unit for managing the resource management route process.

Each of the resource management groups other than the highest-order resource management group includes a process management unit for managing a resource management process which manages resources allocated to its own group, at least one process management unit for managing a process which is a descendant of the resource management process and not included in other resource management groups, and a resource management block for storing information on resources managed by its own group. Each process management unit links to the resource management block, the resource management block links to the process management unit which manages the resource management process, and the resource management block links to a resource management block of a parent resource management group of its own group.

A forming resource management tree is formed ensuring a hierarchical structure between the respective resource management groups by linkage of a resource management block of a child resource management group to a resource management block of a parent resource management group and linkage of each resource management block to the process management unit for managing the resource management route process or to the process management unit for managing the resource management process.

Resources necessary for the resource management group are secured from its parent resource management group by the process management unit for managing the resource management process in accordance with the resource management tree.

In this case, the hierarchical resource management method further comprises the steps of, when a necessary amount for a group is covered by unused resources owned by an immediate parent resource management group of the group, securing the necessary amount of resources for the group by a process management unit of the group for managing a resource management process.

When the unused resources owned by the immediate parent resource management group of its own group are insufficient to satisfy the amount of resources necessary for the newly generated resource management group, resources are acquired equivalent to the shortage from further preceding parent resource management groups to secure the necessary amount.

When the resource shortage can not be covered even by tracing back to the highest-order resource management group, if queuing for release of resources is impossible because of designation by the process management unit which manages said resource management process, as much resources as are securable in the resource management route process and the respective resource management processes are secured.

When queuing for release of resources is possible, the resource management route process queues for release of resources from child resource management groups in the resource management route process and secures the necessary amount of resources upon acquisition of resources filling the shortage.

In the above-mentioned construction, a process management unit for managing a resource management process of a resource management group to disappear releases resources secured by its own group and combines the released resources with unused resources owned by an immediate parent resource management group of its own group.

In the above-mentioned construction, a process management unit for managing a resource management process distributes resources to an individual process in a resource management group within a total amount of resources allocated to the resource management group.

In the above-mentioned construction, a process management unit for managing a resource management process of a resource management group to disappear releases resources secured by its own group and combines the released resources with unused resources owned by an immediate parent resource management group of its own group. Further, a process management unit for managing a resource management process distributes resources to an individual process in a resource management group within a total amount of resources allocated to the resource management group.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to limit to the invention, but are for explanation and understanding only.

In the drawings.

DESCRIPTION OF THE PREFERRED EMBODIMENT

Figure 1:
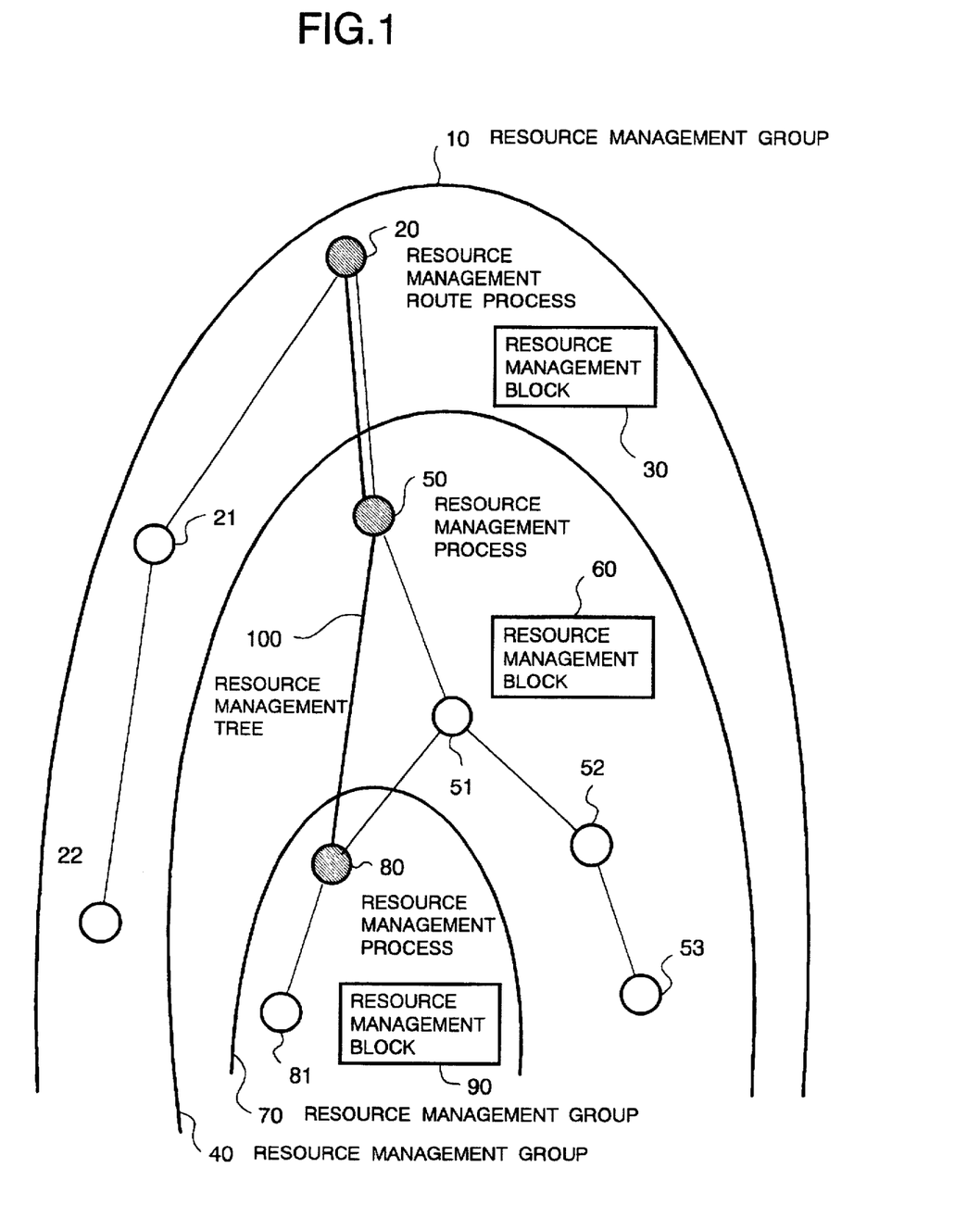
FIG. 1 is a model diagram showing a data structure which implements a hierarchical resource management method according to a first embodiment of the present invention.

A preferred embodiment of the present invention will be described in detail with reference to accompanying drawings. FIG. 1 is a model diagram showing a data structure which implements a hierarchical resource management method according to a first embodiment of the present invention.

As shown in the figure, a resource management route process 20 manages the entire system resources and in combination with its descendant processes 21 and 22, constitutes a resource management group 10. A resource management block 30 stores various kinds of information on resources used by the resource management group 10. The processes 21 and 22 are general processes operating in the resource management group 10, whose parents are the process 20 and the process 21, respectively.

A resource management process 50, which is a process generated with the resource management route process 20 as a parent, manages resources used by a resource management group 40 generated with the resource management group 10 as a parent. The resource management group 40 is made up of the resource management process 50 and its descendant processes 51, 52 and 53. A resource management block 60 stores various kinds of information on resources used by the resource management group 40. The processes 51, 52 and 53 are general processes operating in the resource management group 40, whose parents are the processes 50, 51 and 52, respectively.

A resource management process 80, which is a process generated with the process 51 as a parent, manages resources used by a resource management group 70 generated with the resource management group 40 as a parent. The resource management group 70 is made up of the resource management process 80 and its descendant process 81. A resource management block 90 stores various kinds of resource information. The process 81 is a general process which is generated with the process 80 as a parent and operating in the resource management group 70.

Linking the resource management processes 20, 50 and 80 of the respective resource management groups 10, 40 and 70 in accordance with parent-child relationships of the groups 10, 40 and 70 makes a resource management tree 100. The resources to be used by the resource management groups 10, 40 and 70 are hierarchically distributed following the resource management tree 100 with reference to the resource management blocks 30, 60 and 90 of the respective groups. Thin solid lines in the figure denote a process tree, which lines link the processes 20 and 21, 21 and 22, 20 and 50, 50 and 51, 51 and 52, 52 and 53, 50 and 80, and 80 and 81.

Shown in the model diagram of FIG. 1 is an example where the resource management process 50 comes from the resource management route process 20 and the resource management process 80 comes from the general process 51. Thus, a resource management process as well as a general process can be generated from an arbitrary process of a process tree. Whether a general process such as the process 21, 22, 51–53 or 81, or a resource management process such as the process 50 or 80 is to be generated is designated by a parent process from which the process to be generated comes. A resource management process is generated only at a request for generating a process which designates generation of the resource management process. When the resource management process is generated, a resource management block is simultaneously generated which is referred to and updated by the generated resource management process.

In the model diagram of FIG. 1, the resource management group 40 is equivalent to a subsystem such as TSS (Time Sharing System), batch processing, or OLTP (OnLine Transaction Processing), while the resource management group 70 is equivalent to a unit of a job operating in the subsystem, for example.

Figure 2:
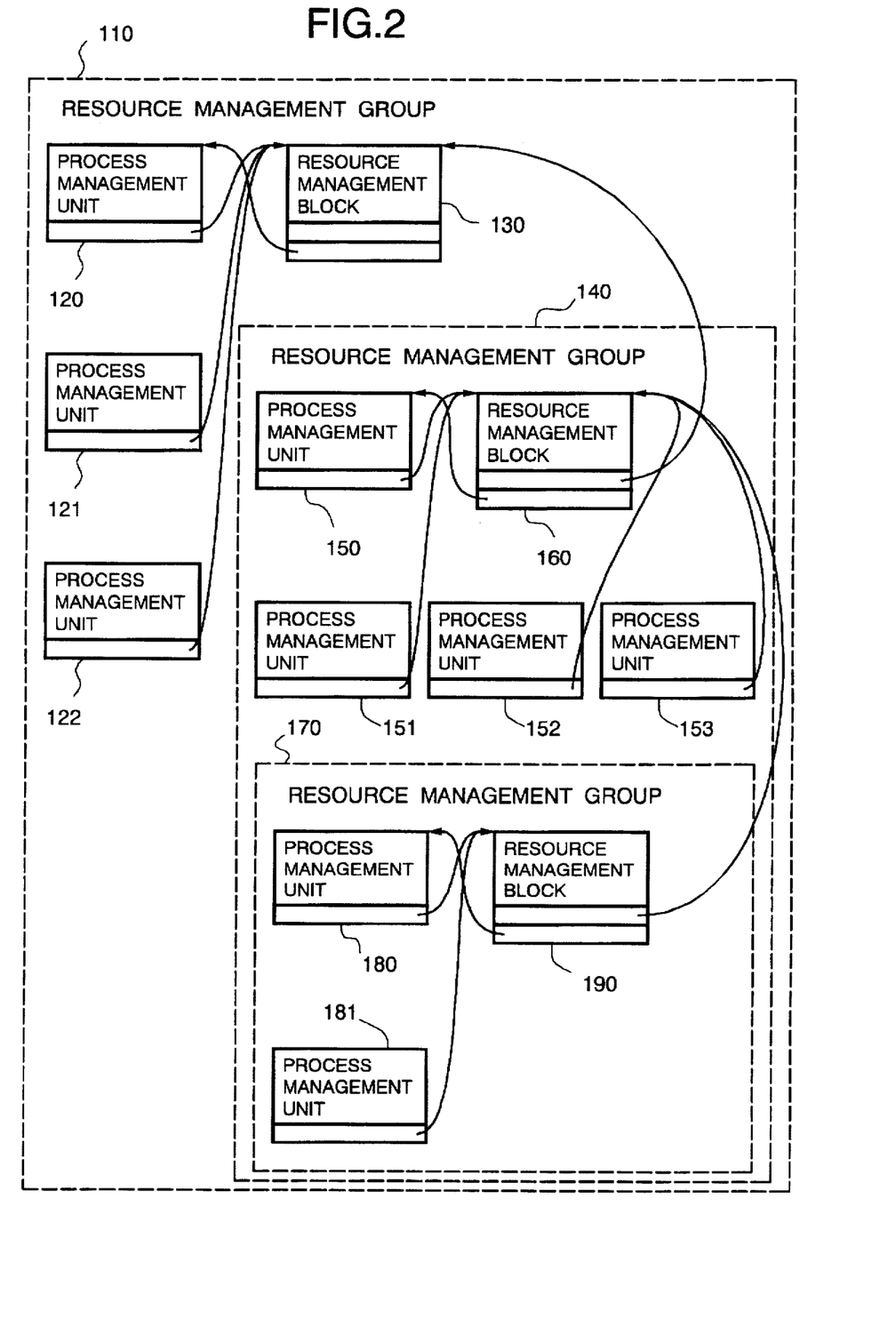
FIG. 2 is a functional block diagram showing an arrangement of the hierarchical resource management method of the present embodiment implemented by a computer system.

FIG. 2 is a functional block diagram showing an arrangement of the hierarchical resource management method according to the present embodiment implemented by a computer system. Illustrated in the figure is the hierarchical resource management method arranged following the example of the model diagram of FIG. 1. In the following, description will be given relating the model diagram of FIG. 1 and the functional block diagram of FIG. 2.

A resource management group 110 corresponds to the resource management group 10 of FIG. 1. A process management unit 120 is for managing the resource management route process 20 of FIG. 1, while process management units 121 and 122 are for managing the processes 21 and 22 of FIG. 1, respectively. A resource management block 130 corresponds to the resource management block 30 of FIG. 1, to which the process management units 120, 121 and 122 link which respectively manage the processes 20, 21 and 22 in the resource management group 110. The resource management block 130 links to the process management unit 120 which manages the resource management process 20 in the resource management group 110.

A resource management group 140 corresponds to the resource management group 40 of FIG. 1. A process management unit 150 is for managing the resource management process 50 of FIG. 1, while process management units 151, 152 and 153 are for managing the processes 51, 52 and 53 of FIG. 1, respectively. A resource management block 160 corresponds to the resource management block 60 of FIG. 1, to which the process management units 150, 151, 152 and 153 link which respectively manage the processes 51, 51, 52 and 53 in the resource management group 140. The resource management block 160 links to the process management unit 150 which manages the resource management process 50 of this resource management group 140. The resource management block 160 further links to the resource management block 130 of the resource management group 110, the parent of the resource management group 140.

A resource management group 170 corresponds to the resource management group 70 of FIG. 1. A process management unit 180 is for managing the resource management process 80 of FIG. 1, while a process management unit 181 is for managing the process 81 of FIG. 1. A resource management block 190 corresponds to the resource management block 90 of FIG. 1, to which the process management units 180 and 181 link which respectively manage the processes 80 and 81 in the resource management group 170. The resource management block 190 links to the process management unit 180 which manages the resource management process 80 in the resource management group 170. The resource management block 190 further links to the resource management block 160 of the resource management group 140, the parent of the resource management group 170.

In FIG. 2, the linkage of the resource management block in the child resource management group to that of the parent resource management group and the linkage of the resource management blocks to the process management units (120, 150, 180) for the resource management processes in the respective resource management groups correspond to the resource management tree 100 of FIG. 1. A resource management block of a parent resource management group is obtained by the linkage from a resource management block of a child resource management group and distribution of resources is carried out by a process management unit for a resource management process to which the obtained resource management block links.

Each process management unit is implemented by a CPU of a personal computer or a workstation, etc. Each resource management block is implemented by a memory such as a RAM or a storage device such as a magnetic disk device.

Figure 3:
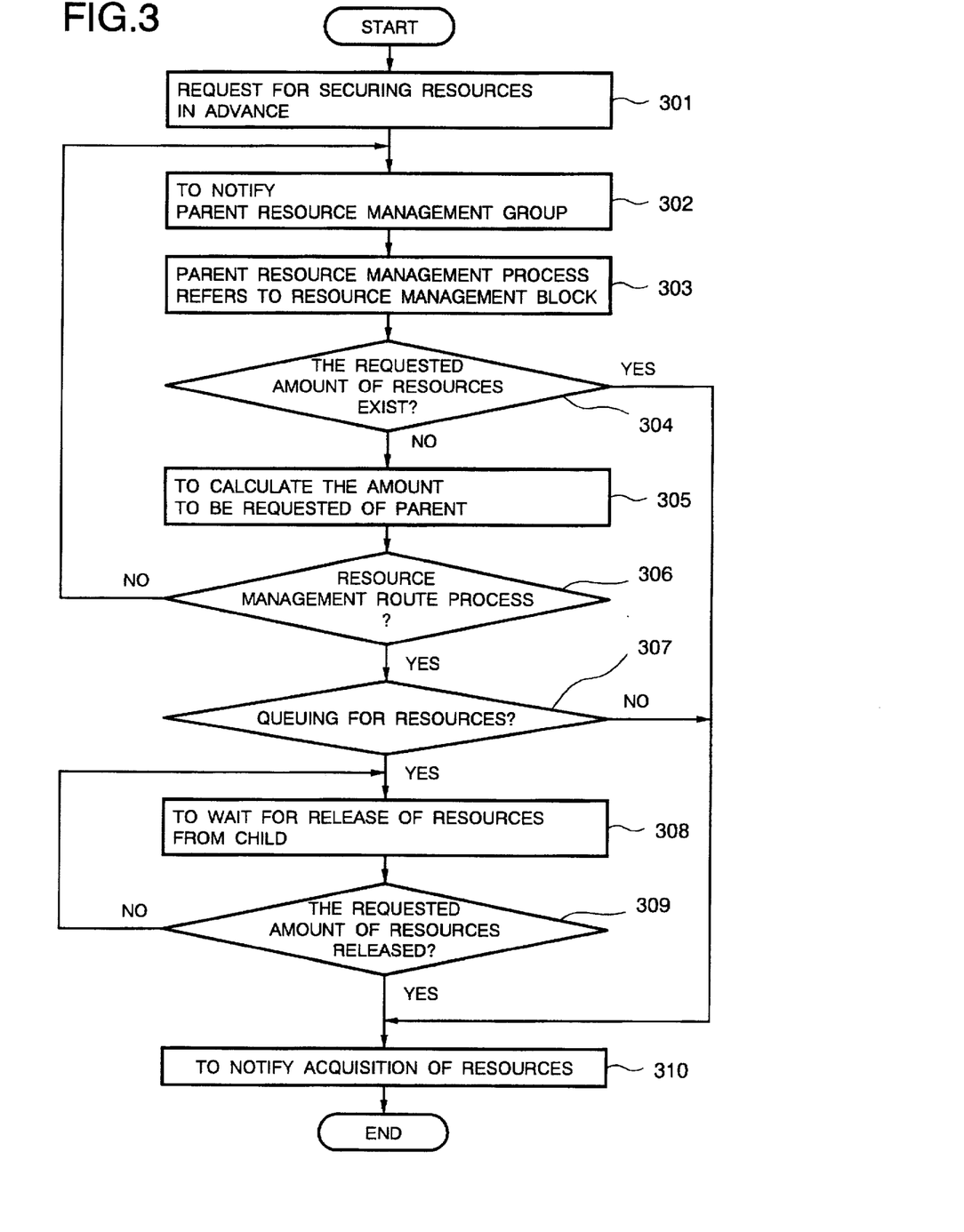
FIG. 3 is a flowchart showing resource securing operation to be executed at the generation of a new resource management group.

FIG. 3 is a flowchart showing operation for securing resources when a new resource management group is generated. At the time of generation of a new resource management group, a resource management process of the new resource management group generates a request for securing group resources in advance (Step 301) and notifies its parent resource management group of the request (Step 302). When the amount of securable resources is less than that required, the resource advance acquisition request can designate, as a function of the resource management process, whether to queue for release of resources as a result of disappearance of other processes etc. (queuing) or not to queue (no queuing).

A resource management process of the parent resource management group having received the notification determines whether a requested amount of resources can be secured or not with reference to the resource management block of the group (Step 303).

As to the requested resources, if

> (the amount of secured resources − the amount of resources in use) ≧ the requested amount of resources to be secured holds, determination is made that the resources allocated to the parent resource management group has free resources fulfilling the request (Step 304) to distribute the requested amount of resources to be secured to the child resource management group (Step 310).

On the other hand, as to requested resources, if

> (the amount of secured resources − the amount of resources in use) < the requested amount of resources to be secured holds (Step 304), the resource management process newly takes the value of (the requested amount of resources to be secured—(the amount of resources being secured—the amount of resources in use)) as a requested amount of resources to be secured by its group (Step 305). Then, if the resource management process is not a resource management route process (Step 306), the process notifies a parent resource management group of the new request for securing resources whose amount is calculated at Step 305 and recursively secures resources.

More specifically, when the value of (the amount of resources being secured—the amount of resources in use) exceeds the notified amount of resources to be secured, the parent resource management group being notified of the resource securing request distributes the requested amount of resources to the child resource management group. When the value of (the amount of resources being secured—the amount of resources in use) falls short of the requested amount of resources to be secured, the parent resource management group recursively repeats operation of taking the value of (the requested amount of resources to be secured—(the amount of resources being secured—the amount of resources in use)) as a newly requested amount of resources to be secured by a parent resource management group of its own group.

On the other hand, when the resource management process is a resource management route process, or if a necessary amount of resources is yet to be secured as a result of tracing back to the resource management route process through the above-described recursive processing (Step 306), determination is made in the resource management route process as to whether a first resource advance acquisition request made by the generated resource management group designates "queuing" or "no queuing" (Step 307). If "no queuing" is designated, the resources being so far secured are recursively distributed to child groups to eventually allocate the resources to the generated resource management group (Step 310).

When the first resource advance acquisition request designates queuing, release of the requested amount of resources from any of child resource management groups is waited for in the resource management route process (Steps 308 and 309). Then, upon acquisition of the requested amount of resources, the resources are recursively distributed to child resource management groups to eventually allocate the requested amount of resources to be secured in advance to the generated resource management group (Step 310).

In other words, in the example shown in FIG. 3, when a resource management process of a newly generated resource management group notifies its immediate parent resource management group of the requested amount of resources to be secured in advance, if there remain necessary resources in the immediate parent resource management group, the resources are distributed from there. If there remains no sufficient resource, a further preceding parent resource management group is notified of the insufficient amount to secure the amount. Such processing is recursively repeated following the resource management tree until tracing back to the resource management route process. On this occasion, when the requested amount is secured in the course of processing, tracing the resource management tree is canceled to recursively distribute the secured amount of resources to the child resource management groups.

On the other hand, in a case where the necessary amount of resources is not acquired even by tracing back to the resource management route process, when queuing for release of resources is impossible because of the designation made by the resource advance acquisition request, the amount of resources so far secured are recursively distributed to child resource management groups. If queuing for release of resources is possible because of the designation made by the resource advance acquisition request, release of resources from other resource management groups is waited for to distribute the requested amount of resources to be secured to the child resource management groups at the time when the released resources reach the requested amount. Resources are secured in advance following this procedure.

Figure 4:
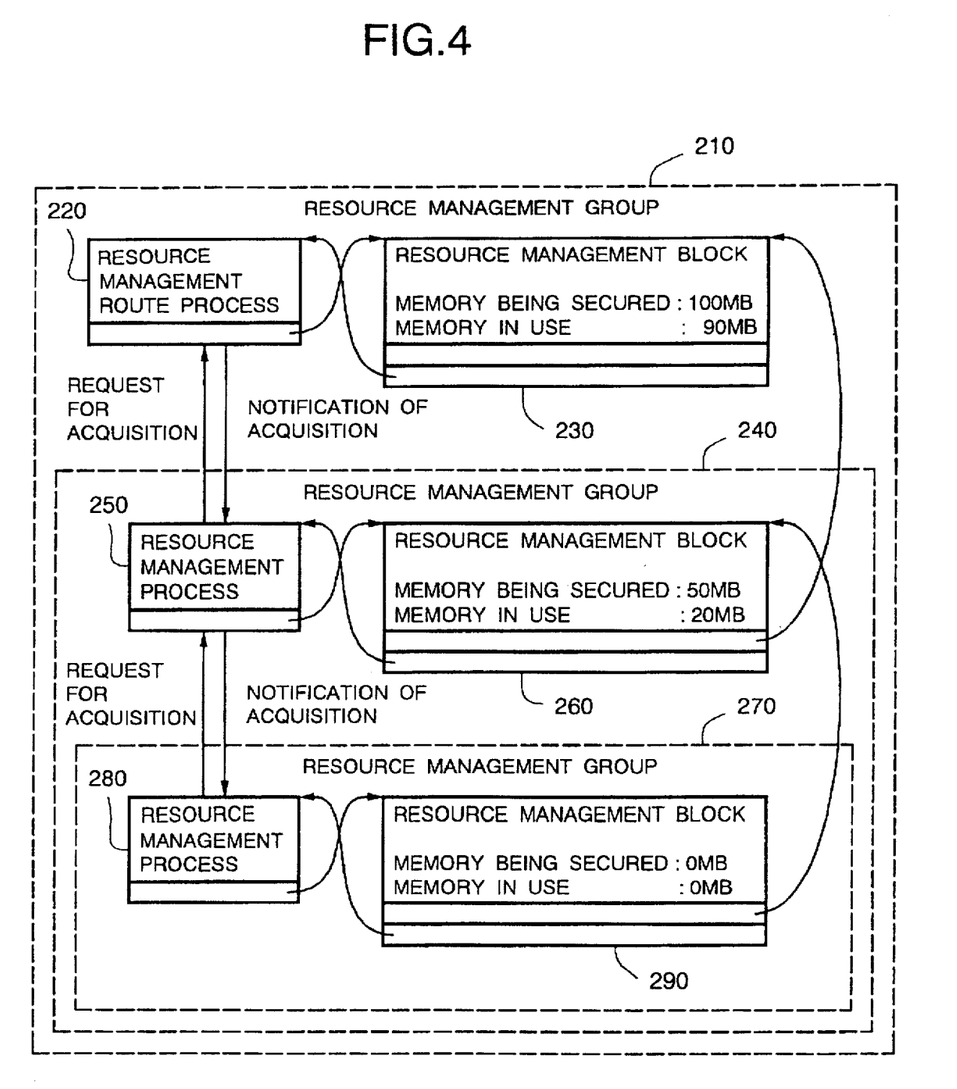
FIG. 4 is a block diagram for use in explaining resource securing operation to be executed at the generation of a new resource management group in the arrangement shown in FIG. 2, taking physical memory as an example of a resource to be secured beforehand.

FIG. 4 is a block diagram for use in explaining resource securing operation to be executed at the time of generation of a new resource management group in the arrangement shown in FIG. 2, taking physical memory as an example of a resource to be secured in advance.

In FIG. 4, a resource management group 210 is a group which manages resources of the entire system. A resource management block 230 of this group secures 100 MB, the total amount of physical memory of the whole system. 50 MB is allocated to a child resource management group 240 of the group 210 and 40 MB is in use by the resource management group 210 itself. A total of 90 MB of physical memory in use is managed. Similarly managed in a resource management block 260 of the resource management group 240 are 50 MB being secured and 20 MB in use by the group itself.

In this state, description will be given of operation for securing 30 MB, 40 MB and 50 MB of physical memory in advance at the time of generation of a resource management group 270.

In a case of 30 MB memory to be secured in advance:

A resource management process 280 of the resource management group 270 requests a resource management process 250 of the parent resource management group 240 to secure physical memory of 30 MB in advance. Here, the resource management process 250 of the parent resource management group 240 is obtained by the linkage of a resource management block 290 of the resource management group 270 to the resource management block 260 and the linkage of the resource management block 260 to the resource management process 250. The resource management process 250 of the resource management group 240, which is notified of the resource advance acquisition request, refers to the linked resource management block 260.

In this case, (the amount of acquired physical memory—the amount of physical memory in use) is 30 MB, which satisfies the requested amount of physical memory. 30 MB physical memory is therefore distributed to the resource management group 270. As a result, advance securing of physical memory completes for the resource management group 270.

In a case of 40 MB physical memory to be secured in advance:

When 40 MB is to be secured in advance, since the parent resource management group 240 has 30 MB as distributable physical memory, the resource management process 250 requests its parent resource management group 210 for 10 MB to make up the shortage. A resource management process (resource management route process) 220 of the parent resource management group 210 refers to the resource management block 230 and allocates free 10 MB left in the block to the child resource management group 240. The resource management process 250 distributes a total of 40 MB of physical memory including the allocated 10 MB and the already secured 30 MB to the resource management group 270. As a result, advance securing of the physical memory completes for the resource management group 270.

In a case of 50 MB physical memory to be secured in advance:

When 50 MB is to be secured in advance, a request for acquiring 20 MB physical memory to make up the shortage is made to the resource management group 210 similarly to the above-described case. The resource management process 220 of the resource management group 210, which is a resource management route process, has only 10 MB as free memory. When the resource advance acquisition request designates "no queuing", the 10 MB is distributed as the acquired physical memory. Because of the designation of "no queuing", the resource management process 250 distributes the total of 40 MB physical memory, which is the sum of the allocated 10 MB and the already secured 30 MB, to the resource management group 270.

On the other hand, when the resource advance acquisition request designates queuing, the resource management route process 220 queues for release of physical memory and refers to the resource management block 230 to give notification of acquisition when free 20 MB is generated. As a result, the resource management group 270 is notified of acquisition of the requested amount of 50 MB.

When "no queuing" is designated by the resource advance acquisition request, the operation results in that the resource management group 270 fails to store up to 50 MB of physical memory. Therefore, when the process of the resource management group 270 operates in this state, conditions such as that for the use of physical memory should be provided so as to execute the job anyhow even with insufficient physical memory.

Figure 5:
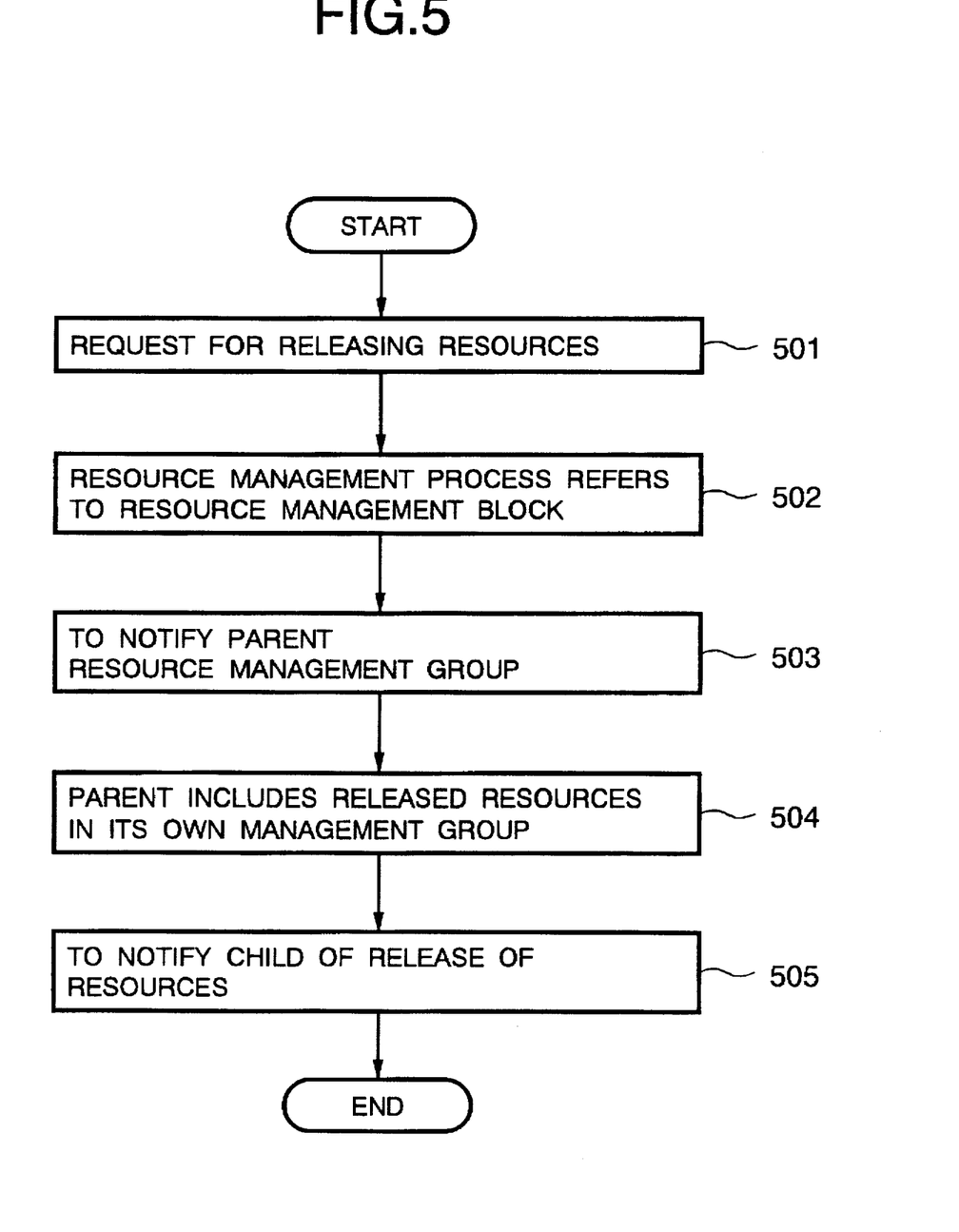
FIG. 5 is a flowchart showing resource release operation to be executed at the disappearance of a resource management group.

FIG. 5 is a flowchart showing resource release operation to be executed when a resource management group disappears. At the disappearance of a resource management group, a request for releasing resources is generated within a resource management process of the resource management group (Step 501). The resource management process of the resource management group to disappear refers to a resource management block of the same group (Step 502), and notifies its parent resource management group of the release of the secured resources (Step 503). The parent includes the notified resources in its own resource management group (Step 504) and notifies the child resource management group of the release of the resources (Step 505). This completes the release of the resources secured by the resource management group to disappear. Disappearance of the resource management group then follows.

Figure 6:
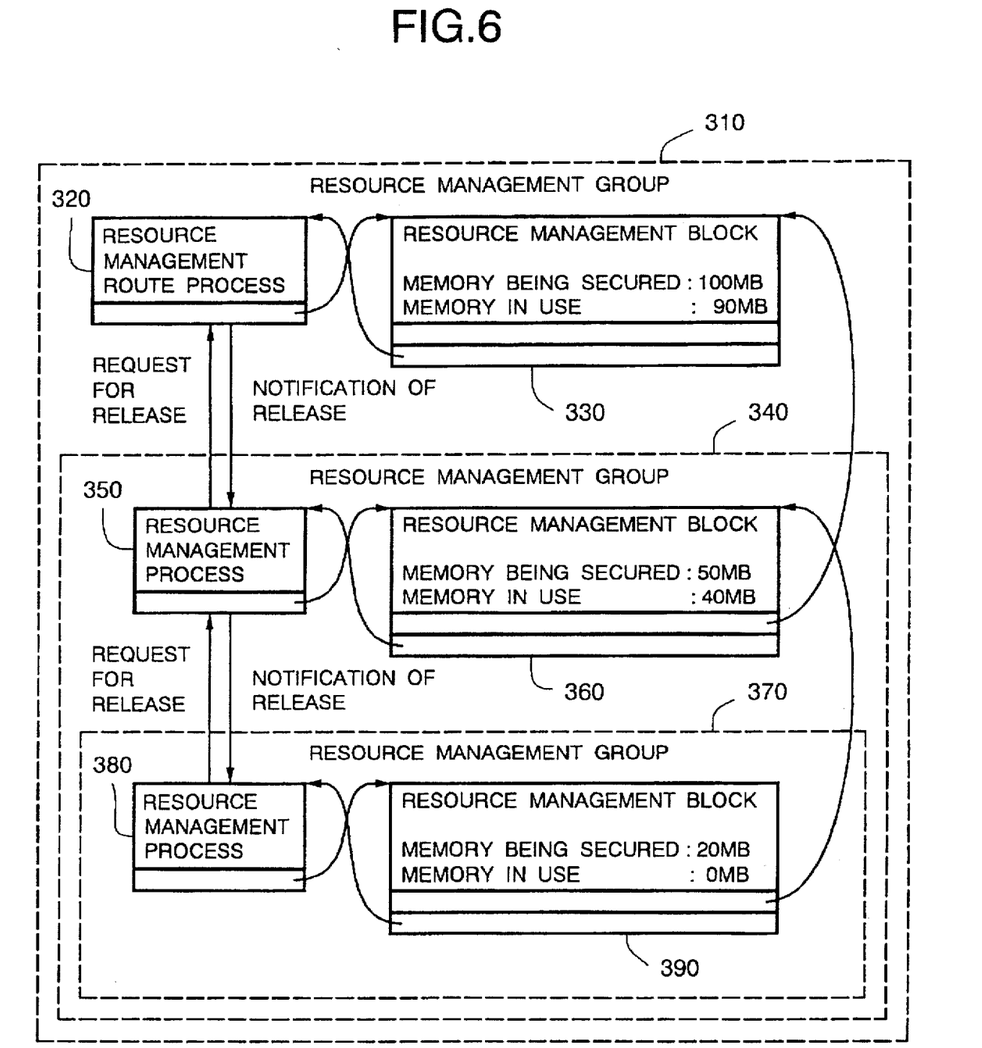
FIG. 6 is a block diagram for use in explaining resource release operation of a resource management group to disappear in the arrangement shown in FIG. 2, taking physical memory as an example of a resource.

FIG. 6 is a block diagram for use in explaining resource release operation of a resource management group to disappear in the arrangement shown in FIG. 2, taking physical memory as an example of a resource.

In FIG. 6, a resource management group 370 secures physical memory of 20 MB and is to disappear. A resource management process 380 of the resource management group 370 refers to a resource management block 390 and notifies a parent resource management group 340 of the release of the 20 MB physical memory being secured. A resource management process 350 of the parent resource management group 340, with the intention of managing the released physical memory by its own group, updates a resource management block 360.

More specifically, the resource management block 360 updates the physical memory of 40 MB in use to 20 MB. This adds 20 MB to the free physical memory of the resource management group 340. Thereafter, the resource management process 340 notifies its child resource management process 380 of the release of the physical memory, completing the release of physical memory of the resource management group 370.

In a case where the resource management group 340 is to disappear thereafter, the resource management process 350 refers to the resource management block 360 and notifies the parent resource management group 310 of the release of 50 MB physical memory being secured, whereby a resource management route process 320 updates the physical memory in use in a resource management block 330 from 90 MB to 40 MB. Then, the process 320 notifies its child resource management process 350 of the release of the physical memory.

Figure 7:
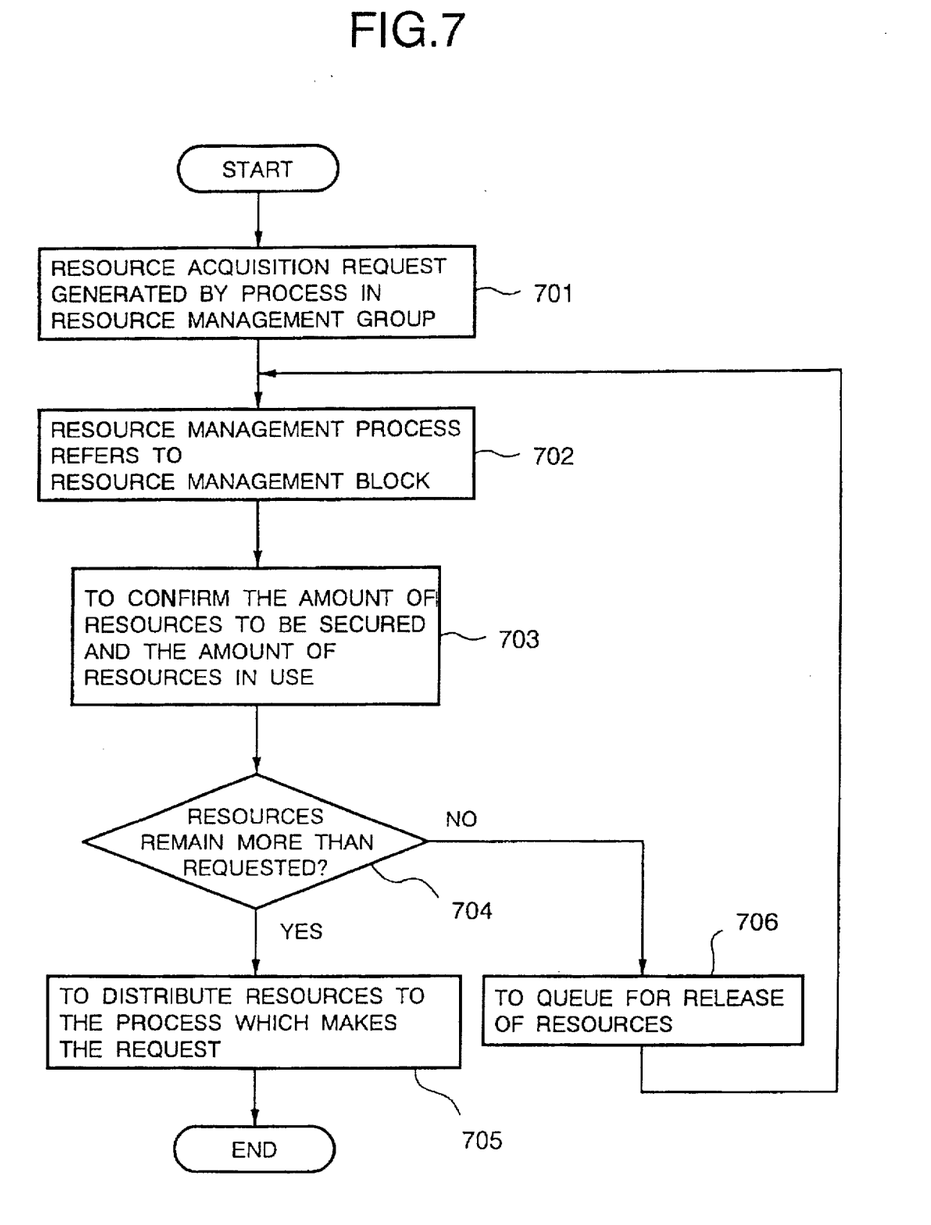
FIG. 7 is a flowchart showing resource securing operation of an individual process in a resource management group.

FIG. 7 is a flowchart showing resource securing operation of an individual process in a resource management group.

When a predetermined process in a resource management group generates a request for acquiring resources (Step 701), a resource management process of the resource management group refers to a resource management block (Step 702) to confirm the requested amount of resources to be secured and the amount of resources in use (Step 703). When the value of (the amount of resources being secured—the amount of resources in use) is not less than the requested amount (Step 704), the resource management process makes notification to the process which has made the request and distributes the requested amount of resources to that process (Step 705). This completes acquisition of the resources by the process which has made the request.

On the other hand, when the value of (the amount of resources being secured—the amount of resources in use) is less than the requested amount (Step 704), release of resources is queued for from other process of the same resource management group or a child resource management group (Step 706). Upon release of the resources from the process, the operation returns to Step 702 to repeat the foregoing processing. Here, the release of resources from the child resource management group is carried out in a manner as described above. The release of the resources from other process in the same resource management group is conducted through updating of a resource management block 430 by a resource management process of the resource management group to reduce the amount of resources in use.

Figure 8:
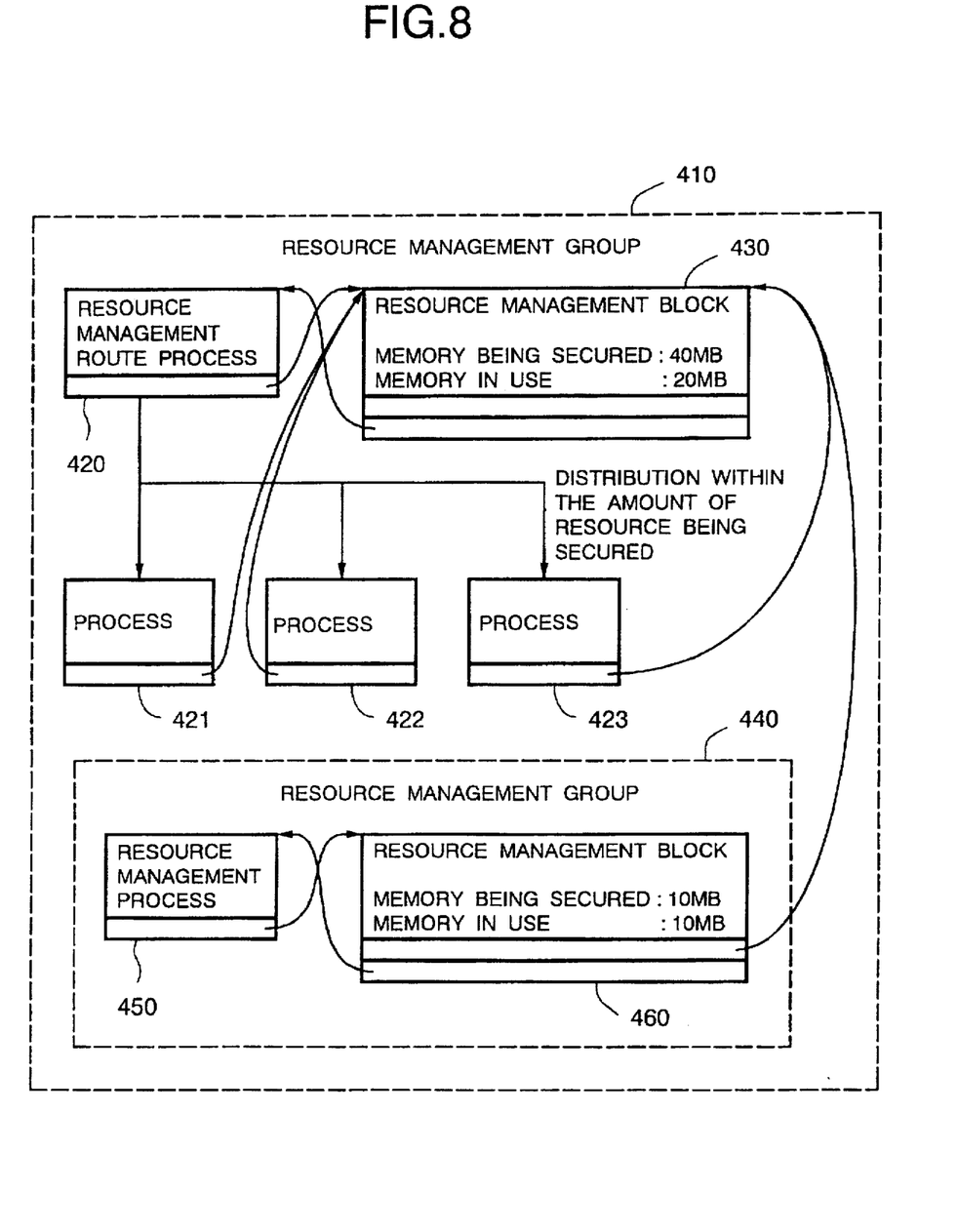
FIG. 8 is a block diagram for use in explaining resource securing operation of an individual process in a resource management group in the arrangement of FIG. 2, taking physical memory as an example of a resource.

FIG. 8 is a block diagram for use in explaining resource securing operation of an individual process in a resource management group in the arrangement shown in FIG. 2, with physical memory as an example of a resource.

In FIG. 8, when a process 421 in a resource management group 410 is to acquire physical memory, a resource management process 420 of this resource management group 410 refers to the resource management block 430. With the amount of physical memory requested by the process 421 being 10 MB, the resource management process 420 distributes 10 MB out of the free physical memory of 20 MB to the process 421. As a result, the process 421 acquires physical memory of 10 MB.

Assuming that the amount of the physical memory requested by the process 421 is 30 MB, since the amount of physical memory allocated to the resource management group 410 has no free memory to fulfill the request, distribution will not be executed immediately. After queuing for release of physical memory from the process 422 or 423 in the resource management group 410, or from a child resource management group 440, the physical memory is distributed to the process 421 upon generation of free physical memory of 30 MB as requested. This enables distribution of physical memory to each process in the resource management group 410 without exceeding the amount of the physical memory secured in the resource management group 410.

The above-described hierarchical resource management method according to the present invention achieves the following effects.

Arrangement of hierarchical resource management groups having parent-child relationships enables hierarchical management of resources. Then, distribution of resources is made to the resource management groups to secure resources necessary for execution of a job prior to generation of a resource management group. This allows preparation of a job execution environment by securing resources for use prior to execution of the job.

In addition, divisional use of resources is possible on a sub-system level such as TSS, batch processing and OLTP.

Furthermore, since in the present invention, resources are distributed to an individual process in a resource management group so as not to exceed the total amount of resources allocated to the resource management group, execution of each job is ensured without being dependent on a process operating in other resource management group and affecting such a process.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A hierarchical resource management method by a time-sharing-oriented operating system for controlling process generation in accordance with parent-child relationships of a tree structure and dynamically managing resources available to the whole operating system on a process basis, comprising the steps of:

forming a plurality of resource management groups, each resource management group including a plurality of processes, in a hierarchical tree structure;

a highest-order resource management group of the plurality of resource management groups including as one of the plurality of processes a resource management route process for managing resources of the whole system, at least one process which is a descendant of the resource management route process and not included in any other resource management group, and a resource management block for storing information on resources managed by the highest-order resource management group including information on resources secured and in use by the highest order resource management group; and each resource management group other than said highest-order resource management group including a resource management process for managing resources allocated to said resource management group, at least one process which is a descendant of the resource management process and not included in any other resource management group, and a resource management block for storing information on resources managed by said resource management group including information on resources secured and in use by said resource management group;

forming a resource management tree by linking said resource management route process as the highest-order parent and each resource management process of each resource management group other than the highest-order resource management group in accordance with parent-child relationships between the respective resource management groups of the hierarchical tree structure; and at the generation of a new resource management group other than said highest-order resource management group, distributing a necessary amount of resources for the newly generated resource management group from those secured by a parent resource management group of said newly generated resource management group in accordance with said resource management tree.

2. The hierarchical resource management method as set forth in claim 1, comprising the steps of:

at the generation of a new resource management group, when a necessary amount of resources for the newly generated resource management group is not more than resources secured and not used by an immediate parent resource management group of the newly generated resource management group, distributing the resources to said newly generated resource management group;

when the resources secured and not used by the immediate parent resource management group of said newly generated resource management group are less than the amount of resources necessary for said newly generated resource management group, tracing back to a further preceding parent resource management group, distributing resources from the preceding parent resource management group to descending resource management groups to secure the necessary amount and then allocating the resources to said newly generated resource management group;

when the resource shortage can not be covered by tracing back to the highest-order resource management group, if queuing for release of resources is designated as not possible for said new resource management group, distributing resources securable in the resource management route process and the respective resource management processes to child resource management groups to allocate the resources to said newly generated resource management group; and when queuing for release of resources is designated as possible, queuing for release of resources from child resource management groups in the resource management route process and sequentially distributing resources to child resource management groups upon acquisition of resources to allocate the resources to said newly generated resource management group.

3. The hierarchical resource management method as set forth in claim 1, further comprising the step of, when a resource management group disappears, releasing resources secured by the resource management group to disappear and combining the resources with resources secured and not used by an immediate parent resource management group of the resource management group to disappear.

4. The hierarchical resource management method as set forth in claim 1, wherein distribution of resources to an individual process in a resource management group is made within a total amount of resources allocated to the resource management group.

5. The hierarchical resource management method as set forth in claim 2, further comprising the step of, when a resource management group disappears, releasing resources secured by the resource management group to disappear and combining the resources with resources secured and not used by an immediate parent resource management group of the resource management group to disappear.

6. The hierarchical resource management method as set forth in claim 2, wherein distribution of resources to an individual process in a resource management group is made within a total amount of resources allocated to the resource management group.

7. The hierarchical resource management method as set forth in claim 2, further comprising the step of, when a resource management group disappears, releasing resources secured by the resource management group to disappear and combining the resources with resources secured and not used by an immediate parent resource management group of the resource management group to disappear, wherein distribution of resources to an individual process in a resource management group is made within a total amount of resources allocated to the resource management group.

8. A hierarchical resource management method by a time-sharing-oriented operating system for conducting control including generation and disappearance of processes in accordance with parent-child relationships of a tree structure and dynamically managing resources available to the whole operating system on a process basis, comprising the steps of:

forming a plurality of resource management groups, each resource management group including a plurality of processes in a hierarchical tree structure;

a highest-order resource management group of the plurality of resource management groups including as one of the plurality of processes a resource management route process for managing resources of the whole system, at least one process which is a descendant of the resource management route process and not included in any other resource management group, and a resource management block for storing information on resources managed by the resource management group including information on resources secured and in use by said resource management group; and each resource management group other than said highest-order resource management group including a resource management process for managing resources allocated to said resource management group, at least one process which is a descendant of the resource management process and not included in any other resource management group, and a resource management block for storing information on resources managed by said resource management group including information on resources secured and in use by said resource management group;

at the generation of a new resource management group, when a necessary amount of resources for the newly generated resource management group is covered by resources secured and not used by an immediate parent resource management group of the newly generated resource management group, distributing the resources to said newly generated resource management group;

when the resources secured and not used by the immediate parent resource management group of said newly generated resource management group are less than the amount of resources necessary for said newly generated resource management group, tracing back to a further preceding parent resource management group, distributing resources from the preceding parent resource management group to descending resource management groups to secure the necessary amount and then allocating the resources to said newly generated resource management group;

when the resource shortage can not be covered by tracing back to the highest-order resource management group, if queuing for release of resources is designated as not possible for said new resource management group, distributing resources securable in the resource management route process and the respective resource management processes to child resource management groups to allocate the resources to said newly generated resource management group; and when queuing for release of resources is designated as possible, queuing for release of resources from child resource management groups in the resource management route process and sequentially distributing resources to child resource management groups upon acquisition of resources to allocate the resources to said newly generated resource management group.

9. The hierarchical resource management method as set forth in claim 8, further comprising the step of, when a resource management group disappears, releasing resources secured by the resource management group to disappear and combining the resources with resources secured and not used by an immediate parent resource management group of the resource management group to disappear.

10. The hierarchical resource management method as set forth in claim 8, wherein distribution of resources to an individual process in a resource management group is made within a total amount of resources allocated to the resource management group.

11. The hierarchical resource management method as set forth in claim 8, further comprising the step of, when a resource management group disappears, releasing resources secured by the resource management group to disappear and combining the resources with resources secured and not used by an immediate parent resource management group of the resource management group to disappear, wherein distribution of resources to an individual process in a resource management group is made within a total amount of resources allocated to the resource management group.

12. A hierarchical resource management method by a time-sharing-oriented operating system for conducting control including generation and disappearance of processes in accordance with parent-child relationships of a tree structure and dynamically managing resources available to the whole operating system on a process basis, comprising the steps of:

forming a plurality of resource management groups, each resource management group including a plurality of process management units, in a hierarchical tree structure, for managing said processes;

a highest-order resource management group of the plurality of resource management groups including as one of the plurality of process management units, a process management unit for managing a resource management route process which manages resources of the whole system, at least one process management unit for managing a process which is a descendant of the resource management route process and not included in any other resource management group, and a resource management block for storing information on resources managed by the resource management group including information on resources secured and in use by said resource management group, said each process management unit linking to said resource management block and said resource management block linking to the process management unit for managing said resource management route process; and each resource management group other than said highest-order resource management group including a process management unit for managing a resource management process which manages resources allocated to said resource management group, at least one process management unit for managing a process which is a descendant of the resource management process and not included in any other resource management group, and a resource management block for storing information on resources managed by said resource management group, said each process management unit linking to said resource management block, said resource management block linking to the process management unit which manages said resource management process, and said resource management block linking to a resource management block of a parent resource management group of its own group;

forming a resource management tree ensuring a hierarchical structure between the respective resource management groups by linking a resource management block of a child resource management group to a resource management block of a parent resource management group and linking said resource management block to the process management unit for managing said resource management route process or to the process management unit for managing said resource management process; and securing resources necessary for the resource management group from its parent resource management group by the process management unit for managing said resource management process in accordance with said resource management tree.

13. A hierarchical resource management method as set forth in claim 12, further comprising the steps of:

when a necessary amount of resources for a group is covered by resources secured and not used by an immediate parent resource management group of the group, securing the necessary amount of resources for the group by a process management unit of the group for managing a resource management process;

when the resources secured and not used by the immediate parent resource management group of its own group are insufficient to satisfy the amount of resources necessary for a newly generated resource management group, sequentially acquiring resources from at least one further preceding parent resource management group to secure the necessary amount;

when the resource shortage can not be covered by sequentially acquiring resources from the highest-order resource management group, if queuing for release of resources is designated as not possible by the process management unit which manages said resource management process, securing resources in the resource management route process and the respective resource management processes; and when queuing for release of resources is designated as possible, queuing for release of resources from child resource management groups in the resource management route process and securing the necessary amount of resources upon acquisition of resources.

14. The hierarchical resource management method as set forth in claim 12, wherein a process management unit for managing a resource management process of a resource management group to disappear releases resources secured by its own group and combines the released resources with resources secured and not used by an immediate parent resource management group of its own group.

15. The hierarchical resource management method as set forth in claim 12, wherein a process management unit for managing a resource management process distributes resources to an individual process in a resource management group within a total amount of resources allocated to the resource management group.

16. The hierarchical resource management method as set forth in claim 13, wherein a process management unit for managing a resource management process of a resource management group to disappear releases resources secured by its own group and combines the released resources with resources secured and not used by an immediate parent resource management group of its own group.

17. The hierarchical resource management method as set forth in claim 13, wherein a process management unit for managing a resource management process distributes resources to an individual process in a resource management group within a total amount of resources allocated to the resource management group.

18. The hierarchical resource management method as set forth in claim 13, wherein a process management unit for managing a resource management process of a resource management group to disappear releases resources secured by its own group and combines the released resources with resources unsecured and not used by an immediate parent resource management group of its own group; and a process management unit for managing a resource management process distributes resources to an individual process in a resource management group within a total amount of resources allocated to the resource management group.

* * * * *